Aug. 8, 1950     C. C. UTZ     2,517,611
MOTOR VEHICLE STABILIZER
Filed Dec. 8, 1945
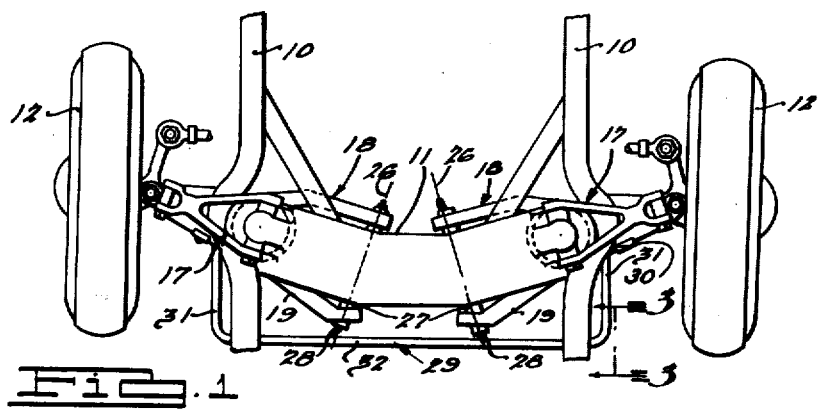
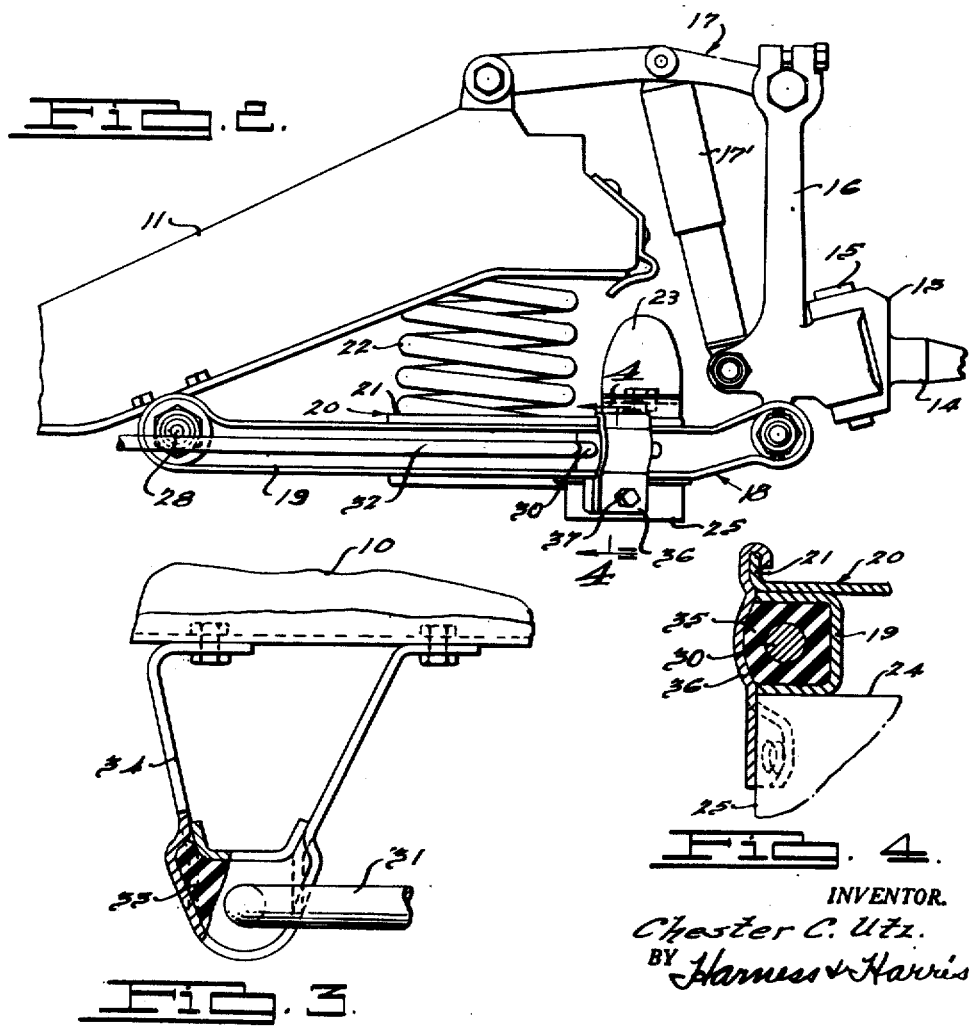
INVENTOR.
Chester C. Utz.
BY Harness & Harris
ATTORNEYS.

Patented Aug. 8, 1950

2,517,611

UNITED STATES PATENT OFFICE 2,517,611

MOTOR VEHICLE STABILIZER

Chester C. Utz, Southfield Township, Oakland County, Mich., assignor to Chrysler Corporation, Highland Park, Mich., a corporation of Delaware Application December 8, 1945, Serial No. 633,696

12 Claims. (Cl. 267—11)

This invention relates to motor vehicles and more particularly to improvements in stabilizing or anti-sway means therefor.

An object of the invention is the provision of a simple, economical, and efficient stabilizer or anti-sway device, and more particularly to provide the same in operative relationship with an independent type of road wheel suspension; and to provide a device of this character which, when applied to the suspension for steerable road wheels, does not restrict steering movement of such wheels.

A further object of the invention is the provision of an improved relationship between a stabilizer device and the wheel suspension thereby making possible use of a linkless type stabilizer device, and more particularly to so relatively arrange these vehicle components as to permit a simple and direct connection between the stabilizer device and the wheel suspension; and to provide a direct connection as aforesaid which is preferably resiliently yieldable and serves to relatively insulate the connected components.

More particularly in the foregoing respects a bar constitutes the stabilizer and has opposite end portions respectively connected to oscillatory mounted wheel suspension arms for movement therewith and has a part intermediate such end portions adapted to resist relative oscillation of the suspension arms by torsional stress thereof, the torsionally stressed bar part being arranged in a geometrical relationship to the axis of oscillation of each such arm which minimizes the tendency of the arm ends to move, under the influence of the aforesaid torsional resistance, and thus permits a simple and direct connection between the bar and suspension arms and avoids the necessity for use of links in this connection.

Other objects of the invention will be more apparent from the following description taken in connection with the accompanying drawings, in which:

Fig. 1 is a top plan view of a portion of the vehicle chassis showing the suspension for a pair of road wheels and a stabilizer or anti-sway device applied thereto;

Fig. 2 is an enlarged fragmentary side elevational view showing a typical wheel suspension, the showing of Fig. 3 being omitted;

Fig. 3 is an enlarged side elevational view taken as indicated by the line 3—3 in Fig. 1;

Fig. 4 is a view, mainly in section, taken on line 4—4 of Fig. 2.

The motor vehicle includes a frame structure including side rails 10 and a connecting cross member 11. Each of a pair of oppositely disposed road wheels 12 is adapted to have rising and falling movement relative to the frame independently of the remaining road wheels by reason of the supporting and guiding suspension means therefor, as typified in Fig. 2, and the same includes a steering knuckle 13 rotatably journalling the wheel 12 by the usual spindle 14. The knuckle 13 is swivelly connected by a king pin 15 with a generally vertically extending knuckle bracket support 16 having articulated or pivoted connections at its upper and lower ends respectively with upper and lower generally laterally extending arm structures 17 and 18, each of which has an oscillating connection with the chassis frame. A shock absorber 17' of the telescoping type is secured to the upper arm structure 17 and the support 16.

Each lower arm structure 18 includes a pair of laterally spaced components 19, each defining a channel in cross section, as typified in Fig. 4, and has secured thereto a seat, designated generally by the numeral 20, having an upwardly directed peripheral flange 21. The chassis is springingly supported upon each arm 18 by a coil spring 22 engaged at one end thereof with the seat 20 and at the other end with the frame cross member 11. A jounce bumper 23 is carried by each arm structure 18. The components 19 are connected by a reinforcement 24 secured to the lower flange thereof and having a downwardly directed flange 25.

Each arm structure 18 is connected to the frame for oscillation about a horizontally disposed axis, as indicated by the line 26 in Fig. 1, each such connection including a pivot member 27 fixed to the frame cross member 11 and having a connection with each component 19 permitting oscillatory movement of the latter relative thereto. A nipple 28 is provided to receive a suitable device for forcing lubricant into the oscillating connection between each component 19 and the member 27, which nipple is substantially axially aligned with its associated member 27.

The stabilizer or anti-sway device is of the linkless type and is provided by a bar of generally bow shape, generally designated by the numeral 29, which is preferably one-piece. This bar has opposite end portions 30 respectively registering with and deflected to extend generally parallel to the forwardly disposed component 19 of the lower arm structures 18. The bar 29 includes a lever arm-forming part 31, which extends forwardly from each such end portion and longitudinally of the vehicle, and a part 32 which extends transversely of the vehicle through a body of rubber-like material 33 supported by a bracket 34 depending from each frame side rail 18. The rubber bodies 33 accommodate limited deflection of the bar part 32 relative to the rails 10 as will be hereinafter set forth.

Each bar end portion 30 is connected to a component 19 of the arm structure 18 by a body of resiliently yieldable material 35, preferably rubber, as shown more particularly in Fig. 4. The body 35 is contoured to be received in the channel and has an opening therein through which the bar end portion extends. A retainer 36 extends across the open side of the channel in registering with the body 35 and has a hook at the upper end thereof engaged with the flange 21 of the spring seat 20, the other end of the retainer being secured to the flange 25 of the reinforcement 24 by a fastener 37. The rubber body 35 is preferably press fitted into the channel and this, together with the pressure exerted thereagainst by the retainer, causes the rubber body to so engage the periphery of the bar end portion 31 that movement of the latter relative to the component is accommodated by flexure of the rubber.

As will be noted from Fig. 2, the stabilizer bar part 32 is disposed substantially in the horizontal plane of the axes 26, but deviating therefrom only to the extent necessary to permit application of a lubricant device to the nipples 29. This disposition of the bar part 32 minimizes the tendency of the bar ends 31 to move in response to relative oscillation of the arm structures 18, thus permitting the use of a simple connection between the bar and the arm structures and avoiding the necessity for connecting links. The bar part 32 is immediately adjacent the extremity of pivot members 27, thus maintaining the length of the lever arms at a minimum which in turn permits use of a bar of smaller cross-section.

In operation the stabilizer operates to prevent tilting or swaying of the sprung portion and in this respect acts on the lower wheel suspension arms to oppose relative oscillation thereof. For example, as one wheel 12 rises or falls relative to the other, the lower arm structure 18 and the bar end portion rises or falls with such one wheel and as an incident thereto the bar part 32 is torsionally stressed and resists the aforesaid movement by reason of the connection of the bar to the arm structure 18 of the opposite wheel suspension, the bar part 31 acting as a lever between the end portion 30 and the part 32. Under these conditions the bar end portions 30 tend to move lengthwise and to rotate, but such movement is of such a degree, due to the location of the bar part 32 relative to the axes 26, as pointed out before, as to be readily accommodated by flexure of the rubber bodies 35.

Although but one specific embodiment of the invention has herein been shown and described, it will be understood that various changes in the size, shape, and arrangement of parts may be made without departing from the spirit of the invention.

I claim:

1. In a vehicle including a sprung part and a pair of supporting road wheels, suspension means for each of said wheels accommodating rising and falling movement of one thereof independently of the other, each of said suspension means including an arm structure connected with said sprung part for oscillatory movement about a horizontal axis disposed in the horizontal plane containing the axis of the other arm structure, a lubricant nipple for each of said connections disposed in approximate alignment with the axis thereof, a coil spring supporting said sprung part on each of said arm structures, each of said arm structures having a component channel-shaped in cross section extending generally lengthwise of such structure, stabilizing means including a linkless bar having opposite end portions respectively disposed in said channel-shaped components, and a body of rubber-like material in each of said channel-shaped components connecting the associated bar end portion thereto for oscillatory rising and falling movement therewith, said bar including a lever arm extending generally longitudinally of the vehicle from each of said end portions and a body part connecting said lever arms extending across the vehicle and transverse to said axes and adapted to be torsionally stressed in response to relative oscillation of said arm structures, said body part being disposed in a horizontal plane deviating from the plane of said axes only to the extent of accommodating application of a lubricant mechanism to each of said nipples and there being means providing a reaction support for said body part.

2. In a vehicle including a sprung part and a pair of supporting road wheels, suspension means for each of said wheels accommodating rising and falling movement of one thereof independently of the other, each of said suspenson means including an arm structure connected with said sprung part for oscillatory movement about a horizontal axis disposed in the horizontal plane containing the axis of the other arm structure, a lubricant nipple for each of said connections disposed in approximate alignment with the axis thereof, a coil spring supporting said sprung part on each of said arm structures, each of said arm structures having a component channel-shaped in cross section extending generally lengthwise of such structure, stabilizing means including a linkless bar having opposite end portions respectively registering with said channel-shaped component, and a body of rubber-like material retained in each of said channel-shaped components against bodily movement relative thereto and having an opening therein receiving the registering bar end portion to thereby connect the latter with the arm structure for oscillatory rising and falling movement therewith, said bar including a lever arm extending generally longitudinally of the vehicle from each of said end portions and a body part connecting said lever arms extending across the vehicle and transverse to said axes and adapted to be torsionally stressed in response to relative oscillation of said arm structures, said body part being disposed in a horizontal plane deviating from the plane of said axes only to the extent of accommodating application of a lubricant mechanism to each of said nipples and there being means providing a reaction support for said body part.

3. In a vehicle including a sprung portion and a pair of oppositely disposed road wheels, suspension means for each of said wheels accommodating rising and falling movement of one independently of the other, each of said suspension means including upper and lower arm structures connected with said sprung portion for oscillatory movement relatively thereto to accommodate the aforesaid movement of the wheel associated therewith and a generally vertically disposed member connecting said arm structures, the axis of oscillation of one of said lower arm structures being disposed in a horizontal plane containing the axis of oscillation of the other arm structure, and a linkless type stabilizer bar operable to resist relative rising and falling movement of one wheel relative to the other having a torsionally active part extending transversely of said sprung part and said axes, means connecting said bar part with said sprung portion for limited movement relative thereto, and to dispose said torsionally active part substantially in said horizontal plane containing said arm axes, said bar having arms projecting generally transversely of said bar part and said arms respectively having portions extending in the lengthwise direction of said bar directly, resiliently connected to said lower arm structures to provide for oscillatory movement of said bar arms with said lower arm structures to thereby torsionally stress said bar part in response to rising and falling movement of one wheel relative to the other.

4. In a vehicle including a sprung portion and a pair of opopsitely disposed road wheels, suspension means for each of said wheels accommodating rising and falling movement of one independently of the other, each of said suspension means including upper and lower arm structures connected with said sprung portion for oscillatory movement relatively thereto to accommodate the aforesaid movement of the wheel associated therewith and a generally vertically disposed member connecting said arm structure, the axis of oscillation of one of said lower arm structures being disposed in a horizontal plane containing the axis of oscillation of the other arm structure, and a linkless type stabilizer bar operable to resist relative rising and falling movement of one wheel relative to the other having a torsionally active part extending transversely of said sprung part and said axes, means connecting said bar part with said sprung portion for limited movement relative thereto, and to dispose said torsionally active part substantially in said horizontal plane containing said arm axes, said bar having arms projecting generally transversely of said bar part and said arms each including a portion extending in the lengthwise direction of said bar, a first body of rubber-like material directly connecting the said portion of one of said arms to one of said lower arm structures for oscillatory movement therewith and a second body of rubber-like material directly connecting the said portion of the other of said arms to the other of said lower arm structures for oscillatory movement therewith thereby to torsionally stress said bar part in response to the aforesaid movements of either wheel relative to the other, each of said bodies of material accommodating movement of its associated arm relative to the connected arm structure in a direction generally lengthwise of the latter in response to the aforesaid movement of the associated wheel.

5. In a vehicle including a sprung portion and a pair of oppositely disposed road wheels, suspension means for each of said wheels accommodating rsing and falling movement of one independently of the other, each of said suspension means including upper and lower arm structures connected with said sprung portion for oscillatory movement relatively thereto to accommodate the aforesaid movement of the wheel associated therewith and a generally vertically disposed member connecting said arm structures, the axis of oscillation of one of said lower arm structures being disposed in a horizontal plane containing the axis of oscillation of the other arm structure, each of said lower arm structures including a component extending lengthwise thereof and channel-shaped in cross-section, and a linkless type stabilizer bar operable to resist relative rising and falling movement of one wheel relative to the other having a torsionally active part extending transversely of said sprung part and said axes and disposed substantially in said horizontal plane containing said axes, means connecting said bar part with said sprung portion for limited movement relative thereto, said bar having arms projecting generally transversely of said bar part having ends respectively extending into said channel-shaped components and a body of rubber-like material in each of said components connecting the arm end portion thereto for oscillatory movement therewith.

6. In a vehicle including a sprung portion and a pair of oppositely disposed road wheels, suspension means for each of said wheels accommodating rising and falling movement of one independently of the other, each of said suspension means including upper and lower arm structures connected with said sprung portion for oscillatory movement relatively thereto to accommodate the aforesaid movement of the wheel associated therewith and a generally vertically disposed member connecting said arm structures, the axis of oscillation of one of said lower arm structures being disposed in a horizontal plane containing the axis of oscillation of the other arm structure, each of said lower arm structures including a component extending lengthwise thereof and channel-shaped in cross section, and a linkless type stabilizer bar operable to resist relative rising and falling movement of one wheel relative to the other having a torsionally active part extending transversely of said sprung part and said axes and disposed substantially in said horixontal plane containing said axes, means connecting said bar part with said sprung portion for limited movement relative thereto, said bar having arms projecting generally transversely of said bar part having ends respectively extending into said channel-shaped components and a body of rubber-like material in each of said components connecting the arm end portion thereto for oscillatory movement therewith, each of said bodies of rubber-like material being so engaged with the connected end portion as to accommodate movement of the latter in a direction lengthwise of the associated arm component in response to oscillatory movement of the latter.

7. In a vehicle including a sprung part and a pair of supporting road wheels, suspension means for each of said wheels accommodating rising and falling movement of one independently of the other, each of said means comprising an arm structure connected to said sprung part for oscillatory movement about an axis disposed in a horizontal plane containing the axis of the other arm structure, each arm structure including a pair of components extending lengthwise thereof and having at least a part defining a channel in cross-section, a spring seat secured to the pair of components of each arm structure and a reinforcement connecting each pair of components, a body of rubber-like material in the channel part of one component of each of said pairs and each said body having an opening therein, stabilizing means including a linkless bar including a torsionally active part extending transversely of said axes and disposed substantially in the horizontal plane containing said axes and having arms extending laterally from said bar part, the end portions of said arms respectively extending into the openings of said rubber-like bodies to thereby connect the same with the respective arm structures for oscillatory movement therewith, means connecting said bar to the sprung part, and a member extending across the open side of each channel part and secured to said spring seat and said reinforcement for retaining said rubber-like body in said channel part.

8. In a vehicle including a frame structure and a pair of oppositely disposed road wheels, means supporting and guiding each of said wheels from said frame structure for rising and falling movement independently of the other wheel, each of said means including upper and lower arm structures extending generally transversely to and outwardly from and pivotally connected to said frame structure for oscillatory movement relative thereto to accommodate said movement of the wheel associated therewith, the axes of pivot of one lower arm structure being spaced one from the other in a direction transversely of the frame structure and one of said axes being disposed in a horizontal plane containing the other of said axes, a generally vertically disposed knuckle support connecting adjacent ends of said arm structures, and a stabilizer bar operable to resist relative rising and falling movement of said wheels including spaced arms extending generally longitudinally of said frame structure and having end portions respectively disposed generally parallel to said lower arm structures, means connecting an end portion of one of said arms to one of said lower arm structures for oscillatory movement therewith and means connecting an end portion of the other arm to the other lower arm structure for oscillatory movement therewith, each of each last means accommodating movement of the connected end portion and arm structure in response to oscillatory movement of the latter, said bar having a part thereof connected to said frame structure and integral with said arms extending transversely to said arms, to said axes, and to said frame structure and adapted to be torsionally stressed in response to relative oscillation of said lower arm structures, said bar part being disposed substantially in the said horizontal plane containing said axes to thereby minimize the aforesaid relative movement between said arm end portions and said arm structures.

9. In combination, a vehicle structure comprising a load-carrying supported part and other parts supporting said load-carrying supported part disposed adjacent opposite sides of said load-supported part, each supporting part including wheel-carrying means, a laterally extending arm and a load-supporting spring arranged intermediate said supported part and said arm, said arm having an articulated connection with said wheel-carrying means and being mounted to said supported part for rising and falling movement relative to the latter about an axis extending generally longitudinally of said supported part and spaced from the corresponding axis of the arm of the opposite supporting part, and said arm having a mounting portion lengthwise thereof intermediate its said axis and its said articulated connection; an elongated resilient one-piece stabilizer bar of generally bow shape between its ends, disposed generally transversely with respect to said arm axes and extending laterally outwardly beyond each of said axes in juxtaposition to said opposite arms with a lengthwise portion of the bar adjacent each end thereof positioned in substantial registration with the said lengthwise mounting portion of its juxtaposed arm, said lengthwise bar portions each having a longitudinal axis; and means mounting said bar to said structure, said mounting means including connection means resiliently securing said lengthwise portions of said bar directly to said lengthwise mounting portions of said arms for rising and falling movement with said arms while accommodating rotative movement of said lengthwise bar portions about their longitudinal axes relative to the arms to which said portions are secured, said bar operating by torsional deflection to oppose relative rising and falling movement of said arms.

10. In combination, a vehicle structure comprising a load-carrying supported part having a longitudinal axis, and other parts supporting said load-carrying supported part disposed adjacent opposite sides of said load-carrying supported part, each supporting part including wheel-carrying means, a laterally extending arm, and a load-supporting spring intermediate said supported part and said arm, said arm having an articulated connection with said wheel-carrying means and being mounted to said supported part for rising and falling movement relative to the latter about a generally horizontal axis spaced from the corresponding axis of the arm of the opposite supporting part and extending at an acute angle to the longitudinal axis of the supported part such that the said axes of the opposite arms converge toward each other, and said arm having a mounting portion lengthwise of the arm intermediate its said axis and its said articulated connection; an elongated resilient one-piece stabilizer bar of generally bow shape between its ends, extending generally transversely of said longitudinal axis of the supported part adjacent said supporting parts, said bar having a substantially straight mid portion and a pair of cranklike legs offset from said mid portion, each leg including a pair of offset lengthwise portions one beginning at said mid portion and the other being adjacent the end of the bar and extending outwardly from the said one portion into registering juxtaposition with said lengthwise mounting portion of the arm of the adjacent supporting part, said other lengthwise portions of each leg having a longitudinal axis; and means mounting said bar to said structure, said mounting means including connection means resiliently securing said other lengthwise portions of the legs of said bar directly to said lengthwise mounting portions of said arms for rising and falling movement with said arms while accommodating rotative movement of said other lengthwise portions of the legs about their longitudinal axes relative to the arms to which said portions are secured, said bar operating by torsional deflection to oppose relative rising and falling movements of said arms.

11. In combination, a chassis structure comprising a frame and an individual wheel suspension disposed adjacent opposite sides of said frame, each suspension including a wheel-carrying part, a laterally extending arm and a weight-supporting spring intermediate said frame and said arm, said arm having an articulated connection with said wheel-carrying part and being mounted to said frame for rising and falling movement relative to said frame about an axis extending generally longitudinally of said frame and spaced from the corresponding axis of the other arm in a direction laterally of said frame, and said arm having a mounting portion lengthwise thereof intermediate its said axis and its said articulated connections; an elongated resilient one-piece stabilizer bar of generally bow shape between its ends disposed generally transversely with respect to said arm axes and extending laterally outwardly beyond each of said axes in juxtaposition to the said arms of said opposite suspensions with a lengthwise portion of said bar adjacent each end thereof positioned in substantial registration with the said lengthwise mounting portion of its juxtaposed arm, said lengthwise bar portions each having a longitudinal axis; and means mounting said bar to said structure, said mounting means including connection means resiliently securing said lengthwise portions of said bar directly to said lengthwise mounting portions of said arms for rising and falling movement with said arms while accommodating rotative movement of said lengthwise bar portions about their longitudinal axes relative to the arms to which said portions are secured, said bar operating by torsional deflection to oppose relative rising and falling movements of said arms.

12. In combination, a chassis structure comprising a frame and an individual wheel suspension adjacent opposite sides of the frame, each suspension including a wheel-carrying part, a laterally extending arm, and a weight-supporting spring intermediate said frame and said arm, said arm having an articulated connection with said wheel-carrying part and being mounted to said frame for rising and falling movement relative to said frame about a generally horizontal axis extending generally longitudinally of said frame and spaced from the corresponding axis of the arm of the opposite suspension in a direction generally laterally of the frame, each of said arms having a channel-shaped mounting portion lengthwise thereof intermediate its said axis and its said articulated connection; an elongated resilient one-piece stabilizer bar of generally bow shape between its ends, disposed generally transversely with respect to said arm axes and extending laterally outwardly beyond each of said axes in juxtaposition to the said arms of said opposite suspensions with a lengthwise portion of the bar adjacent each end thereof disposed in the said channel-shaped mounting portion of its juxtaposed arm, said lengthwise bar portions each having a longitudinal axis, and the portion of the bar intermediate said lengthwise portions being disposed in juxtaposition to a plane containing the said axes of said arms; and means mounting said bar to said structure, said mounting means including connection means comprising resiliently deformable bodies disposed in said channel-shaped mounting portions of said arms resiliently securing said lengthwise portions of the bar directly to said lengthwise mounting portions of said arms for rising and falling movement with said arms while accommodating rotative movement of said lengthwise bar portions about their longitudinal axes relative to the arms to which said portions are secured, said bar in the portion thereof between said lengthwise portions thereof operating by torsional deflection to oppose relative rising and falling movements of said arms.

CHESTER C. UTZ.

REFERENCES CITED

The following references are of record in the file of this patent:

UNITED STATES PATENTS

| Number | Name | Date |
|---|---|---|
| 2,190,298 | Slack | Feb. 13, 1940 |
| 2,254,261 | Best | Sept. 2, 1941 |
| 2,254,325 | Slack et al. | Sept. 2, 1941 |
| 2,263,107 | Smirl | Nov. 18, 1941 |
| 2,275,637 | McIntyre et al. | Mar. 10, 1942 |
| 2,299,935 | Slack et al. | Oct. 27, 1942 |